United States Patent
Chun-Chih

[11] 3,863,205
[45] Jan. 28, 1975

[54] AUTOMOBILE OVER SPEED PREVENTION DEVICE

[76] Inventor: Hsian Chun-Chih, 2 Lane 60, Tai-Shun St., Taipei, Taiwan

[22] Filed: July 6, 1972

[21] Appl. No.: 236,155

[52] U.S. Cl. ............................... 340/32, 340/52 R
[51] Int. Cl. .............................................. G08g 1/09
[58] Field of Search ......... 340/52 R, 53, 62, 66, 71, 340/22, 32, 33

[56] References Cited
UNITED STATES PATENTS

| | | | |
|---|---|---|---|
| 1,987,275 | 1/1935 | Tatter | 340/53 |
| 2,332,699 | 10/1943 | Culpepper | 340/53 |
| 2,836,669 | 5/1958 | Rosenberg | 340/66 |
| 2,852,086 | 9/1958 | Cordry | 340/22 |
| 3,035,133 | 5/1962 | Greenberg | 340/52 R |
| 3,375,496 | 3/1968 | Antunovic | 340/66 |
| 3,550,076 | 12/1970 | Kent | 340/22 |
| 3,571,790 | 3/1971 | Lusebrink | 340/62 |
| 3,597,730 | 8/1971 | McClellan et al. | 340/32 |
| 3,635,306 | 1/1972 | Davis | 340/263 |

Primary Examiner—William C. Cooper
Assistant Examiner—Randall P. Myers

[57] ABSTRACT

This invention relates to a speed limiting device which can actually limit the speed of vehicle according to the prescribed limits of various regions. The device is controlled by an accelerator support interposed in the path of an accelerator pedal. When the prescribed speed is exceeded, indicators will be erected and visual and audio signals will be produced. Every person on the scene will be able to take precaution and thus accident may be avoided. The device is readily adjustable to suit alterations in loading conditions and the slope of the road.

5 Claims, 7 Drawing Figures

Patented Jan. 28, 1975

AUTOMOBILE OVER SPEED PREVENTION DEVICE

Prevention of automobile accidents is a universal desire. So far as we know, "Overspeed" is the first factor of automobile accidents both in China and in Japan. In United States it causes about 35 percent of all automobile accidents, next only to alcoholism which holds the first place. Therefore, limitation of automobile speed should be implemented strictly.

The present invention provides a method for (1) controlling the engine revolution and thus the driving speed by limiting the operational range of the accelerator with an accelerator support, (2) indicating beforehand the local limit of speed inside and outside the vehicle. Furthermore when the limit is reached, or when overtaking another car or ascending a slope, additional alarm signal is lighted to warn the pedestrians, passengers, other vehicles and the driver himself, as well as to alert the policeman, so that disastrous accidents may be avoided.

The desirability of providing an automobile with some means for adjustably limiting its speed is acknowledged. Even well-intentioned drivers may unconsciously exceed established speed limits. Consequently, many devices have been provided for this purpose. None of these devices has met with public approval, however, and automobiles continue to operate without some form of speed limiting control. The inacceptability of these devices appears to stem from a number of factors, the most important of these being the expensiveness and the difficulty of installation.

Accordingly, it is an object of the present invention to provide a speed limiting means for motor-driven vehicles which is relatively inexpensive, which may be easily installed without alteration in essentially all automobile types. In addition to the above factors, an acceptable speed-limiting device must be easily or automatically adjustable to suit different conditions such as: (a) different speed limits of different regions, (b) different load, (c) the condition of the car, new or old (For cars of same model, an old car may need 40° of accelerator operation on a level road while a new one needs only 30° of accelerator operation. But the degree of accelerator operation depends solely on the position of the accelerator support.) (d) the conditions of highway and the dynamics of traffic. The above conditions include driving out of the region with specific speed limit, increasing or decreasing the load on the way, ascending a slope, overtaking another vehicle and other emergencies. This invention, besides its economy and simple installation, can be adjusted readily to accommodate local speed limits and the load at that time. Besides, this invention permits the freedom of abrupt acceleration of deceleration which may be necessary in various extraordinary situations such as change of slope or overtaking another vehicle. Instantaneous responsiveness to various situations without the need of any adjustment is a special feature and an important object of this invention.

Today, practically every country in the world prescribed limitation for traffic speed. They guage the speed of vehicle by radar, they supervise the traffic flow by television camera. In Jarkata, Indonesia, buses are equiped with special locks which prohibit the speed over 40Km/h. However, none of these expedients is effective enough. The best way is to make the driver indicate before he starts if he would obey the limitation, and whenever speed limit is exceeded in climbing a slope or overtaking another vehicle, audio and visual signals appear. Policemen may identify with a glance which vehicle is breaking the limits, and which one intends to do so. Pedestrians and other vehicle may take precaution beforehand, and passengers may know if the vehicle is overspeed and thus accident may be avoided. The interior and exterior speed limit preindicating indicator (purple indicator) and speed exceeding indicator of this invention can accomplish the above requirements. Accordingly, Policemen may prevent breaking of limits before hand, pedestrian and other vehicles may take early precaution, passengers, in preventing accidents, may object the exceeding of speed. This is another object of this invention.

DESCRIPTION:

The following description explains the speed limiting and indicating device which involves an accelerator support interposed in the path of accelerator pedal utilized to control engine revolution, means for controlling the accelerator support, means for preindicating the local speed limits and the actual automobile working conditions (including slope climbing, overtaking another vehicle and overspeed) inside and outside the vehicle.

This description explains the mounting of hanging cord at a suitable position of the accelerator support, the hanging cord being adaptable to various loading conditions. It further explains the installation and the art of an extension spring which allows acceleration in climbing slope.

A complete understanding of the invention may be obtained by following the illustrated description below.

The speed limiting mechanism of this invention is installed in the vicinity of the driver's seat, while the indicators are mounted on prominent position both internally and externally.

All the elements of this invention were made of common metals or other suitable materials.

Figure 1:
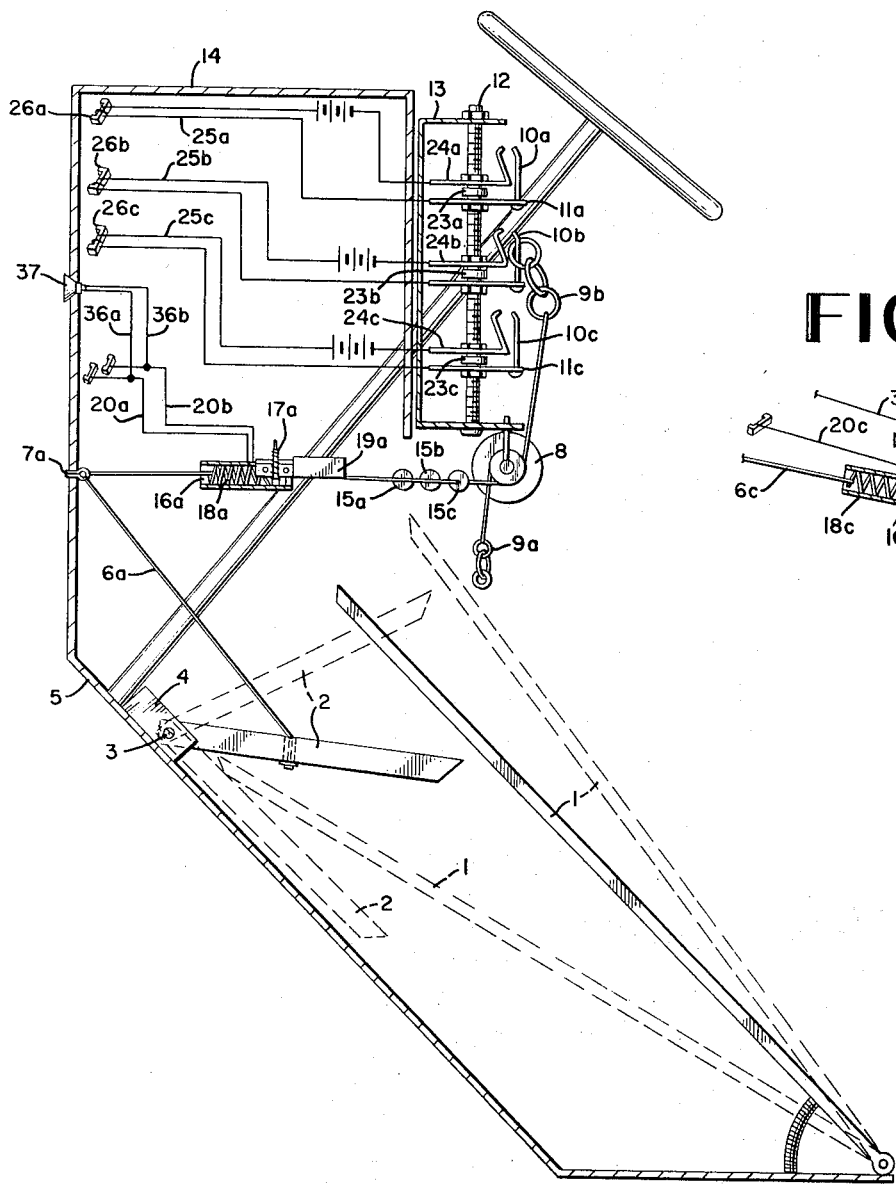
FIG. 1 is a side elevational view of speed limiting device. To facilitate understanding, the electric wire, electromagnet, idle roller and the indicators are not drawn in their actual relative position, their actual numbers are also different from those shown in the FIGURE.
Figure 1A:
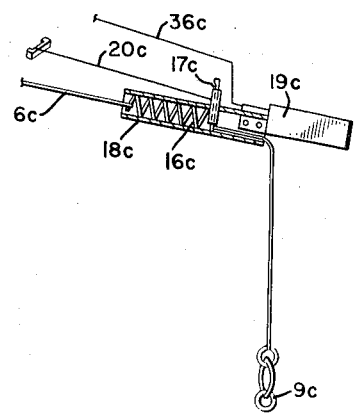
FIG. 1A is an enlarged view of the extension spring mechanism for the hanging cord.
Figure 2:
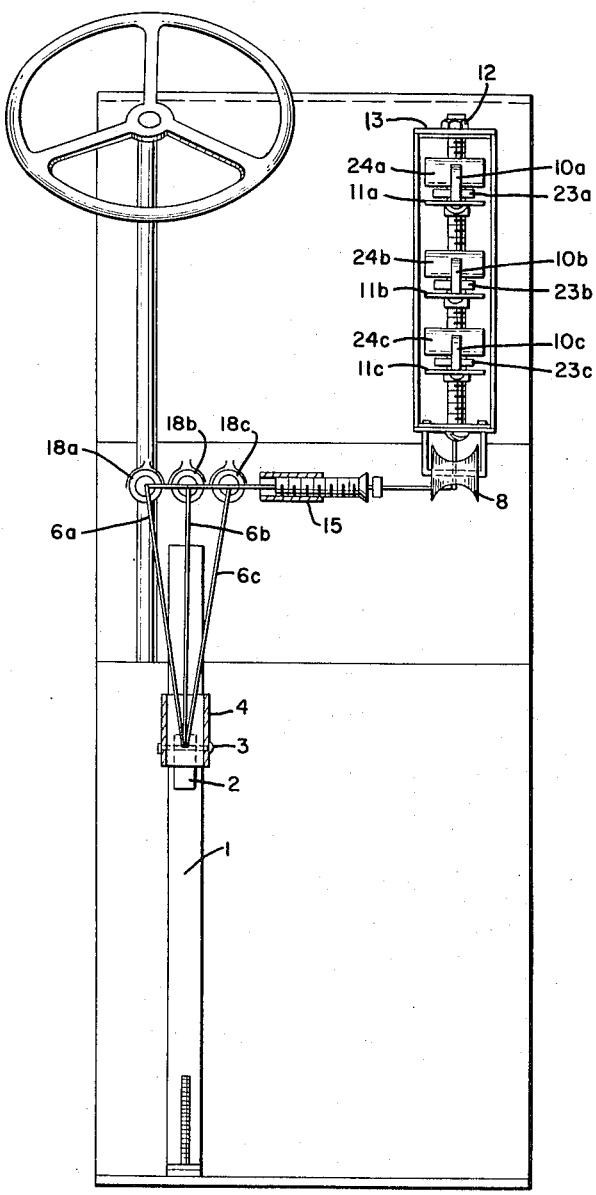
FIG. 2 is the front view of speed limiting device.

1. Speed limiting device and overspeed indicator:

Referring to FIG. 1 and FIG. 2, an accelerator support 2 is installed just before the hind-pivoted accelerator pedal 1. The upper end of accelerator support 2 is in touch with the accelerator pedal 1. The other end of accelerator support 2 is joined by a horizontal pivot 3 to the accelerator support bearing 4 which is fixed to the floor board 5. Three nylon cords are fastened to a suitable position of the accelerator support 2 and are called the hanging cords 6a, 6b and 6c. The hanging cords 6a, 6b and 6c, after going through idle wheel(s)

(The number of the idle wheels depends on the changes of direction of the cord), wind on pulley 8, on the end of the hanging cord emerging from the pulley several bunches of copper rings called load adapting hanging rings 9a, 9b, 9c are attached. Each bunch (proper insulation for holding is necessary) shall at least have three rings corresponding to light, medium and heavy load within a specific grade. Each bunch governs a grade of load. If loading is divided into ten grades, then there shall be ten bunches of rings, otherwise it will be impossible to regulate the flow of fuel according to the load. In case the load is divided into three grades, the rings for the three bunches can be made in different shapes, viz. bunch of retangular rings 9a for light grade, bunch of circular rings 9b for medium grade, bunch of triangular rings 9c for heavy grade. Within a grade, use the upper ring for light load, lower ring for heavy load. Several copper hanging pegs are provided. The number of hanging pegs corresponds to the number of speed limits in relevant country. In Taiwan, the speed limits are 40km, 60km and 80km per hour, hanging pegs 10a, 10b, and 10c are provided for these three limits. In United States, there are eight speed limits, eight hanging pegs should be provided. The mounting plates 11a, 11b, 11c of the hanging pegs are fixed on bolt 12, tightened on upper and lower sides with nuts. Bolt 12 and nuts are properly insulated from the mounting plate. The bolt holder 13 is fixed on a suitable position in the instrument panel 14 to facilitate the operation of the driver. In a suitable position of the hanging cords 6a, 6b and 6c, three extensible bolts 15a, 15b and 15c of length 15cm each are provided to adjust the length of the hanging cord 6.

In another suitable position of the hanging cords 6a, 6b and 6c, a slope climbing (as well as vehicle overtaking, alarm emitting and overspeed) four purpose extension spring 16a, 16b and 16c (three extension springs for three overspeed indicators). The upward ends of the extension springs are enveloped with copper sleeves 17a, 17b, and 17c which are used as electrical contact terminals. The extension springs are covered with envelopes 18a, 18b and 18c which are joined together with the springs at the left ends, the right ends of the spring envelopes do not connect with the springs but are joined rigidly to copper foils 19a, 19b and 19c which are connected by insulated wires 20a, 20b, 20c through a battery, then to the electromagnets (not in FIG.). The electromagnets are used to erect the respective overspeed indicators. Two other wires are connected parallel to electromagnet from each of 20a, 20b and 20c to the external purple overspeed indicator 21a, 21b and 21v, two other wires to interior overspeed indicators installed at the hind of the vehicle to show the passengers that speed limit has been exceeded. The overspeed indicator 21a, 21b and 21c described above, besides that its electrical connection being effected from the contact of copper sleeve 17a, 17b and 17c with copper foil 19a, 19b and 19c, is identical in the operation of indicator erection operation and overspeed visual alarm to the speed limiting pre-indicating indicator and speed limiting pre-indicating visual alarm described below.

If slope climbing extension spring is not provided, position of the hanging ring must be shifted for slope climbing or overtaking another vehicle and is quite troublesome. When slope climbing extension spring is provided and when the speed limits and the load remain constant, the driver does not need to make any alteration in the speed limiting system and he can be free from the worry of overspeed, since he will be warned by the alarm when he unintentionally does so.

Figure 3:
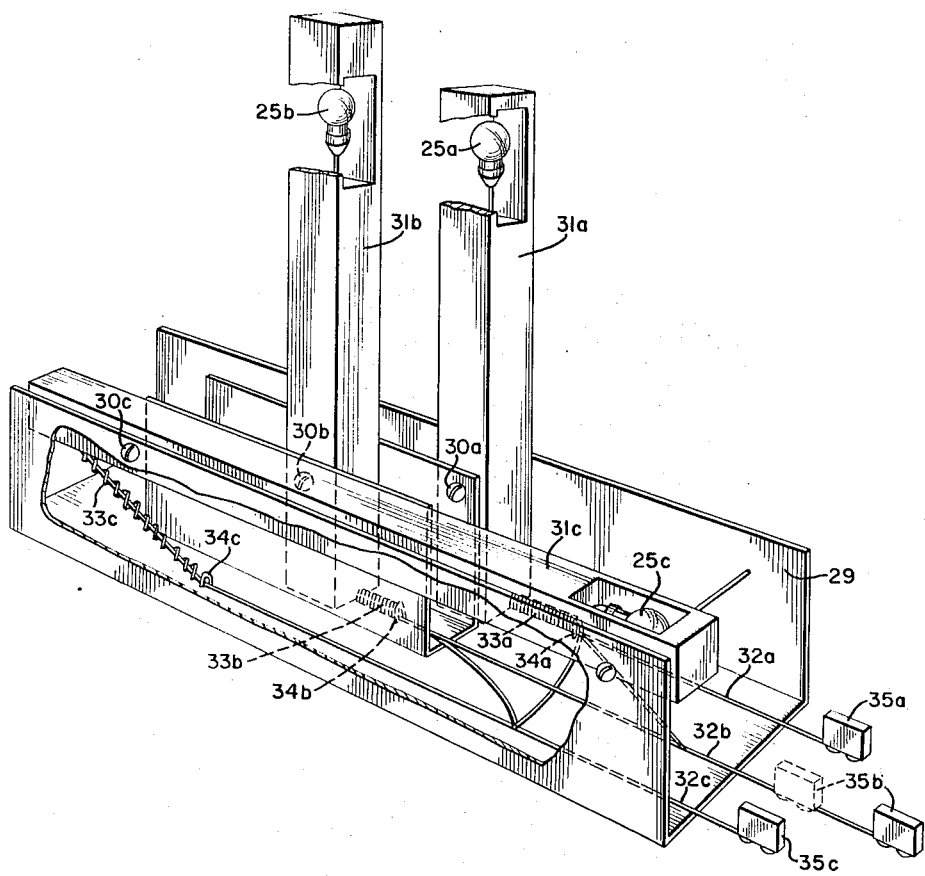
FIG. 3 is a perspective view of the indicator.
Figure 5:
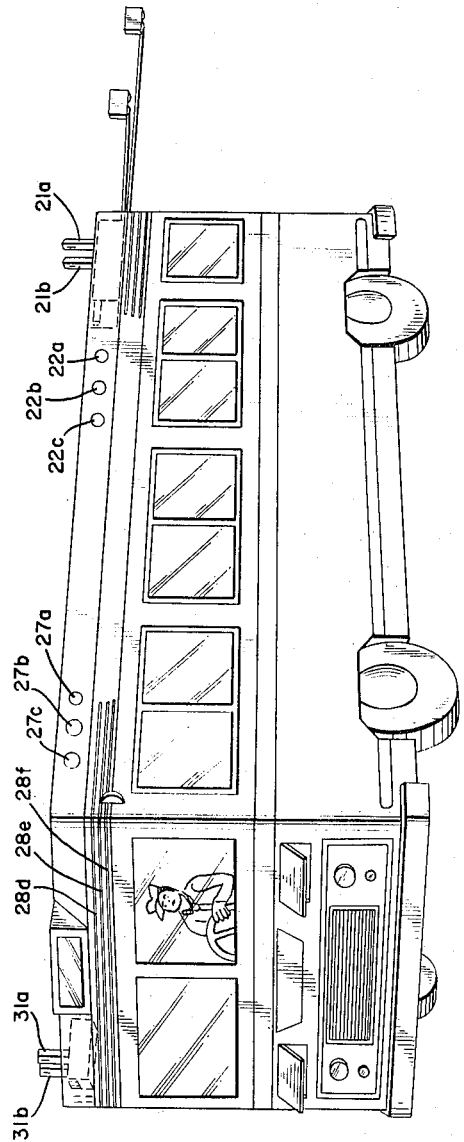
FIG. 5 shows the suitable position of the overspeed prevention device on a vehicle.

2. Speed limiting preindicating device:

Referring to FIGS. 1 and 2, insulating plates 23a, 23b, and 23c are placed atop the copper hanging peg mounting plates 11a, 11b and 11c. Bent copper terminals 24a, 24b and 24c are placed atop the insulating plates. Insulated wires 25a, 25b and 25c are connected to the hanging peg mounting plates and bend copper foils from the battery and electromagnet 26a, 26b and 26c respectively. From wires 25a, 25b and 25c, parallel branches are connected to the interior speed limiting preindicating light 27a, 27b, and 27c installed at the head portion of the vehicle (see FIG. 5) to inform passengers about the prescribed traffic speed limit. (This light is installed in similar way to indicating light in elevator.) Parallel branches from 25a, 25b and 25c, after going through switches (in daylight, erection of indicators is enough, the lights can be switched off) (not in FIG.) dead to the light bulb 28a, 28b and 28c inside the speed limiting indicator located at the head portion of the vehicle (see FIG. 3) to inform the outsiders the prescribed speed limit (see FIG. 5). If the light bulbs 28a, 28b, 28c inside the indicators and interior indicating lights 27a, 27b and 27c are eliminated thoroughly, neon lamps or fluorescent tubes 28D, 28E, 28F of suitable colours are adopted instead and are fixed on suitable exterior and interior position, say, overspeed indicating light on the hind portion of the vehicle, speed limit preindicating light on the front portion of the vehicle. Referring to FIG. 3, indicator box 29 which is 30cm in length, 16cm in width and 7cm in height is installed on suitable and prominent external position. Horizontal pivots 30a, 30b and 30c (three pivots are used so that the number of erected indicators may be clear from all directions) are installed at suitable location inside the box. On the pivots blue speed limiting preindicating indicators 31a, 31b, and 31c are mounted (The indicators are blue (purple represents overspeed) or purple translucent tubes with square cross section of 3cm width and of over 29cm in length (other suitable sizes will also do) with a speed limiting preindicating light or overspeed indicating light installed in each of them.)

Figure 4:
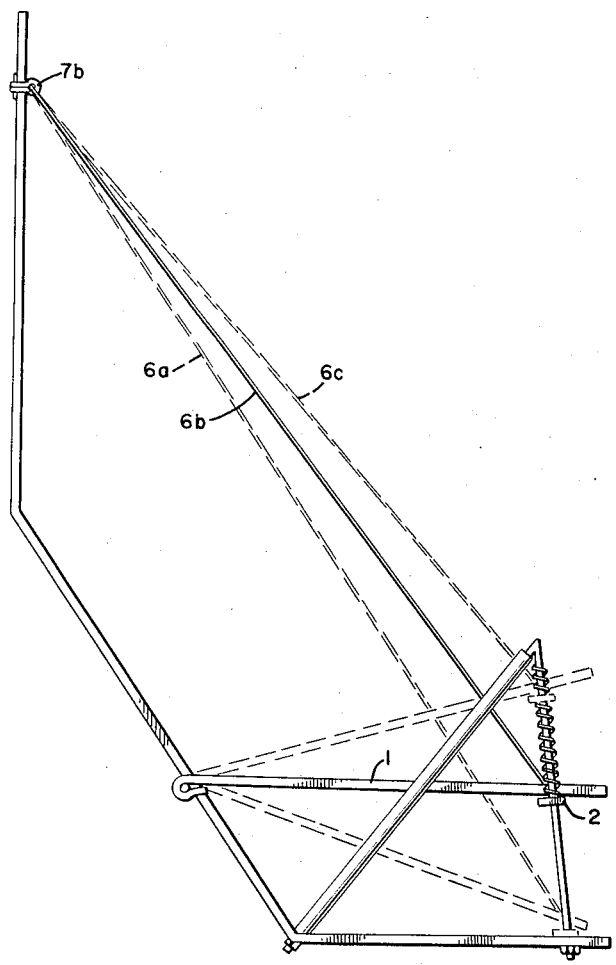
FIG. 4 is the front view of accelerator support for frontpivoted accelerator pedal.
Figure 4A:
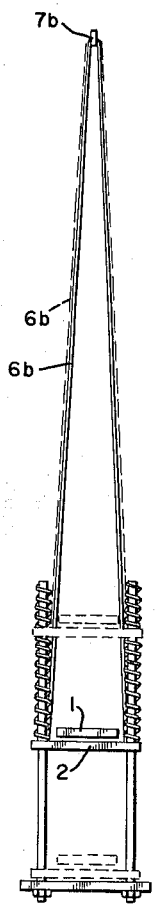
FIG. 4A is a side view of an accelerator support for a front-pivoted accelerator pedal.

The number of indicators will depend on the number of speed limits in relevant country. In Taiwan, a blue or purple indicator may stand for 40 Km/n, two such indicators for 60Km/n, three such indicators for 80Km/n. Holes are bored at the lower end of the indicators, nylon string 32a, 32b, 32c are fastened. Spring 33a, 33b and 33c are also fastened at the hole, enveloping the springs respectively. Each spring, after passing through a stop ring, utilized to block the right direction (as seen in FIG. 4) of the enveloping spring (34a, 34b or 34c) is fastened to a piece of wheeled soft iron. (35a, 35b, or 35c). The wheeled soft iron is placed at suitable distance from respective electromagnet. The end of nylon string 32a has three forks suitably, tied to indicators 31a, 31b and 31c respectively. The end of nylon string 32b has two forks suitably, tied to indicators 31a and 31b respectively. The end of string 32c is tied to indicator 31c alone. Hence, when the upper ring of circular hanging rings 9b is hanged on hanging peg 10b, the hanging ring 9b will surely touch 24b, forming electrical connection betwen 10b, 11b and 24b, electromagnet 26b is magnetized, then wheeled soft iron 35b will be attracted by 26b, indicators 31a and 31b, being pulled by string 32b which is attached to wheeled soft iron 35b, are erected to indicate a speed limit of 60Km. But when the electromagnet 26b is idle, springs 33a, 33b enveloping the strings will extend and pulled the wheeled soft iron to its original place, the preindicating indicators 31a and 31b are now pulled down. Similarly, when hanging ring 9a (or 9c) is hanged on hanging peg 10a (or 10c), preindicating indicator 31a, 31b amd 31c (or 31c) will be erected to indicate a speed limit of 80Km (or 40Km), when hanging ring 9a (or 9c) is taken away from the hanging peg 10a (or 10c), the preindicating indicators 31a, 31b and 31c (or 31c) will lie down.

The hanging rings and the hanging pegs have the function of switches in the operation of speed limit preindication. So when hanging ring is placed at the hanging peg corresponding to 40Km, relevant electric circuit being closed, electromagnet will be magnetized and indicator standing for 40Km will be erected. When the hanging ring is taken away from the 40Km hanging peg, the circuit is opened, indicator for 40Km will lie down. Similarly, when hanging ring is hanged on or taken away from hanging peg corresponding to 60Km or 80Km, indicators for 60Km or 80Km will be erected or pulled down.

If the preindicating system is deemed as necessary sometimes, unnecessary some other time, a switch may be provided (not in fig.) to switch on or off the preindicating operation. In case the preindicating system is deemed as unnecessary altogether, then all concerning mechanism may be eliminated, leaving only the overspeed alarm device.

With or without the speed limiting preindication system, when driving speed exceeds the local prescribed limit, the accelerator pedal I will depress the accelerator support to such an extent that copper sleeve 17 touches copper foil 19 (Hanging cord will pull the four purpose extension spring, the extension spring extends, spring envelop will move together with the left end of the extension spring. The other end of the extension spring is fixed by hanging cord 6 hanging on hanging peg 10. So sleeve 17 is stationary, and as the spring extends, the copper foil 19 approach copper sleeve 17). Their contact closes an electric circuit which lights the overspeed alarm light and ring the overspeed alarm bell. Overspeed indicators is also erected to warn the driver, passengers, pedestrains, other vehicles and to alert the policeman that this car is driving at an exceeded speed.

Only one hanging ring is being hanged on a selected hanging peg at a time, the other being standby. So only one of the extension spring is in use. Take for example, the elongation of extension spring 16c (or 16a or 16c) will make copper sleeve 17b (or 17a or 17c) contact with copper foil 19b (or 19a or 19c), closing in an electrical circuit, lighting the overspeed alarm light, operating the overspeed audio alarm, erecting indicators to indicate the exceeding of a specific limit.

3. Audio alarm device

Referring to FIG. 1, parallel branches 36a, 36b, 36c are connected to the wires 20a, 20b, 20c at suitable position, the branches lead to the audio alarm device 37 (Suitable music or speech recording may be used instead of bell or buzzer to avoid noise). When the extension spring 16b (or 16a or 16c) is pulled by the accelerator support to certain extent, copper sleeve 17b (or 17a or 17c) will touch copper foil 19b (or 19a or 19c), sound will be emitted from the alarm device. But when accelerator pedal is slackened, spring 16b (or 16a or 16c) contracts, copper sleeve 17b (or 17a or 17c) will then leave the copper foil 19b (19a or 19c). The sound will then stop.

The sound may be switched off at any time by a switch (not in fig). installed on wire 36b (or 36a or 36c).

Note: The above arrangement is designed for vehicle with hind-pivoted accelerator pedal. If the pedal is front-pivoted, accelerator support and its triangular stand as shown in FIG. 4 should be adopted. The mechanism beyond the hanging cords 6a, 6b and 6c, and idle rollers 7a, 7b, etc. is identical to that mentioned above.

Usage:

Before driving, the driver should select a proper hanging ring according to the loading conditions and a proper hanging peg according to the prescribed limit in local area. Then the selected hanging ring should be hanged on the selected hanging peg to accomplish speed limiting function, speed limit preindicating function and overspeed indicating function. If the driver does not wish to limit his driving speed, then no hanging ring will be hanged on any hanging peg. In such case, there will be no erection of indicators, no visual and audio alarm. The speed limiting device will be out of function.

Next, if the hanging cord is too long by more than 2cm, it should be shortened from the fastening point. If the extra length is between 1cm and 2cm, it can be adjusted by turning the extensible bolt 15. If the extra length is within 1cm, then it can be adjusted by turning the nut at the upper and lower side of the hanging peg.

If the load remain the same while the vehicle has entered into an area with different speed limits, another hanging peg should be selected. If speed limits remains unchanged while the load has changed, another hanging ring should be selected. If speed limits unchanged while the load has changed, another hanging ring should be selected. For example, a vehicle with light load being driven in Taipei City. Speed limit in the city is 40Km/h, the driver should hang the upper ring of circular hanging rings 9a to hanging peg 10a which corresponds to 40Km/h. If the load is not changed while the vehicle has entered to surburban area where the speed limit is 60Km/h, he should hang the upper ring of 9a to hanging peg 10b which corresponds to 60Km/h. If the vehicle still with light load is driven on supper highway where the speed limit is 80Km/h, the upper ring of 9a should be hanged on hanging peg 10c which corresponds to 90Km/h. In short, hanging peg should be selected according to speed limit, while hanging ring should be selected according to loading condition.

When ascending a slope (or overtaking another vehicle or overspeed), about 300 gm of force must be exerted by the driver on the accelerator pedal (such a force is still insufficient to step an egg broken). If this force is deemed as too little, the force of the extension spring may be increased to desired extent, but it should not be increased to the extend that further extension is impossible, otherwise the driver will feel troublesome when ascending a slope or overtaking another vehicle, though at this time a hgher degree of accuracy may be attained). Extension spring 16 will extend further depression of accelerator 1 and accelerator support 2 to facilitate slope climbing.

After the climbing, force on accelerator is decreased, the extension spring 16 shortens, the accelerator pedal is pulled back to its normal position of level driving. If erection of overspeed indicators continues, overspeed light and overspeed bell continues after slope climbing or after overtaking another vehicle, people on the scene will know that the driver is driving overspeed. He may be checked immediately.

The above statement relates how the driver may make use of this invention. Now we are going to state how the government may make use of this invention. Besides, ordering policemen to pay attention to the speed limit preindicating indicators and overspeed indicators of every vehicle, the government may entitle passengers with the right to remind, supervise or even prohibit the driver to overspeed. (In case the driver prohibition, the passengers may demand the return of fares). The government may even rule that if the passengers neglect this right, the driver will not be held responsible in case of accident. Or remarkable rewards may be given to passengers, pedestrains, other vehicles or local people who report the overspeed according to the exterior or interior signal. I think, under such encouragement, people will be ready to report any breaking of speed limits. There may be part time or even professional reporter. In such case, the speed limiting lock (as in Indonesia) is no longer necessary. Only by requesting policemen to be traffic referee about 35 percent of the traffic accident may be avoided.

As for the source of rewards, we may use the fines and the radar operation expense. If the government does not adopt this system but continues to use the ineffective speed gauging radar and the out-of-date method of prosecuting after occurrence of accidents, traffic accidents can not be decreased. If the financial conditions of a country allow the installation of traffic supervising television camera at the intervals of about every 10Km, and the camera being protected from intentional destruction, (there are cases of intentional smearing with mud, covering with paper and even breaking of the lens), deterrent effect may be attained, but the effect is not so good as the convenient method of ordering every vehicle to be equipped with this device and requesting policemen to pay attention to the signal, entitling and encouraging passengers to report cases of overspeed.

I claim as my invention:

1. A vehicle speed limiting and overspeed indicating system comprising an accelerator support interposed in the path of a hind-pivoted accelerator pedal, a plurality of hanging cords fastened to said accelerator support and movable in response to pivotal motion of said support as the accelerator pedal is operated, an extension spring interposed between a first and second portion of each hanging cord, a length adjusting bolt interposed between the second and third portion of each hanging cord, a plurality of load adjusting hanging rings attached at the end of the third portion of each hanging cord, a plurality of mounting plates held by a mounting bolt to a bolt holder which is rigidly attached to the vehicle, a hanging peg and bent copper terminal separated by insulating means attached to each mounting plate with one end of each mounting plate and bent copper terminal attached to the inner side of said bolt holder such that when a hanging ring is inserted on a hanging peg an electrical circuit connection is closed between said hanging peg, and hanging ring and the corresponding bent copper terminal to actuate speed limit indicating means on the vehicle both externally and internally wherein the combination of each hanging cord, relevant extension spring, hanging ring, hanging peg, and bent copper terminal defines a particular speed limit, a copper sleeve enveloping the bent end of the extension spring at the end nearest to the second portion of the hanging cord and acting as an electrical contact terminal and a copper foil attached to the extension spring and acting as a second terminal such that said terminals come in contact with each other during extension of said extension spring when the speed limit is exceeded to actuate both internal and external vehicle overspeed indicating means.

2. The vehicle speed limiting and overspeed indicating system according to claim 1, including a plurality of blue speed limit indicators and purple overspeed indicators to be installed at prominent positions both externally and internally wherein said indicators include colored fluoresent lamps, a built-in light bulb in each indicator, a plurality of electro-magnets, a plurality of wheeled soft irons and strings used for erecting the indicators and audio alarm means.

3. The vehicle speed limiting and overspeed indicating system according to claim 1 wherein at least three load adapting hanging rings are arranged in a bunch corresponding to light, medium and heavy load and each bunch is provided with an insulating cover.

4. A vehicle speed limiting and overspeed indicating system comprising a suspension type bar accelerator support interposed in the path of a front-pivoted accelerator pedal, a triangular stand used as a pair of rails for said suspension bar, a plurality of hanging cords with their lower portion divided into two forks, each being fastened to one end of said suspension bar, and movable in response to pivotal motion of said support as the accelerator pedal is operated, an extension spring interposed between a first and second portion of each hanging cord, a length adjusting bolt interposed between the second and third portion of each hanging cord, a plurality of load adapting hanging rings attached at the end of the third portion of each hanging cord, a plurality of mounting plates held by a mounting bolt to a bolt holder which is rigidly attached to the vehicle, a hanging peg and bent copper terminal separated by insulating means attached to each mounting plate with one end of each mounting plate and bent copper terminal attached to the inner side of said bolt holder such that when a hanging ring is inserted on a hanging peg an electrical circuit connection is closed between said hanging peg, said hanging ring and the corresponding bent copper terminal to actuate speed limit indicating means on the vehicle both externally and internally wherein the combination of each hanging cord, relevant extension spring, hanging ring, hanging peg and bent copper terminal defines a particular speed limit, a copper sleeve enveloping the bent end of the extension spring at the end nearest to the second portion of the hanging cord and acting as an electrical contact terminal and a copper foil attached to the extension spring and acting as a second contact terminal such that said terminals come in contact with each other during extension of said extension spring when the speed limit is exceeded to actuate both internal and external vehicle overspeed indicating means.

5. The vehicle speed limiting and overspeed indicating system according to claim 4, including a plurality of blue speed limit indicators and purple overspeed indicators to be installed at prominent positions both externally and internally wherein said indicators include colored fluoresent lamps, a built-in light bulb in each indicator, a plurality of electromagnets, a plurality of wheeled soft irons and strings used for erecting the indicators and audio alarm means.

* * * * *